July 27, 1954

A. R. STEPHANY 2,684,830

SILENT BALL COCK

Filed March 1, 1949

INVENTOR.
ALBERT R. STEPHANY,
BY
*Allen & Allen*
ATTORNEYS.

Patented July 27, 1954

2,684,830

UNITED STATES PATENT OFFICE 2,684,830

SILENT BALL COCK

Albert R. Stephany, Newport, Ky.

Application March 1, 1949, Serial No. 78,929

7 Claims. (Cl. 251—333)

This invention relates to a silent ball cock. In my copending application, Serial No. 20,053, filed April 9, 1948, now Patent No. 2,564,286, August 14, 1951, I disclosed and claimed a silent ball cock in combination with a pressure regulator, wherein the pressure regulator and ball cock were built together as a single unit.

There are situations in which it is desirable that the ball cock and pressure regulator be separate, so that one or the other may be replaced or repaired without the necessity of disassembling the entire unit. Furthermore, the combined ball cock and pressure regulator is somewhat expensive to manufacture and will not be suitable for installation in inexpensive closets.

It is an object of the present invention, therefore, to provide a ball cock similar to that disclosed and claimed in my copending specification above referred to, but which ball cock is separate and distinct from a pressure regulator, and which may be used with or without a pressure regulator.

It is another object of my present invention to provide a ball cock which will be absolutely silent in operation, which can be easily disconnected for cleaning or repair, and which can be adjusted with great ease.

These and other objects of my invention which I shall describe in more detail hereinafter, or which will be apparent to one skilled in the art upon reading these specifications, I accomplish by that certain construction and arrangement of parts of which I shall now disclose an exemplary embodiment.

Reference is made to the drawings forming a part hereof, and in which.

Figure 1:
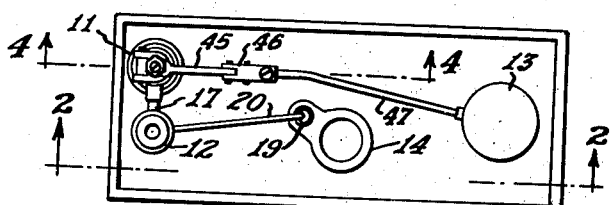
Figure 1 is a horizontal sectional view through a water closet supply tank showing my valve in position.
Figures 2, 3:
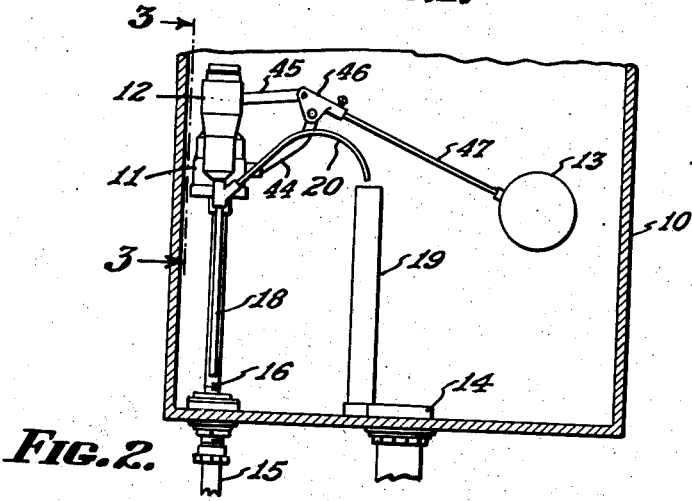
Figure 2 is a vertical cross sectional view of the same, taken on the line 2—2 of Figure 1.
Figure 3 is a vertical cross sectional view of the same, taken on the line 3—3 of Figure 2.

In Figure 1, the water closet supply tank is indicated at 10, the ball cock is indicated at 11, the pressure regulator at 12, the float ball at 13, and the flush valve at 14. The details of the flush valve have been omitted for clarity, since they form no part of the present invention. In Figures 1 to 3, water is supplied from a pipe 15 through a pipe 16 to the valve 11. From the valve 11, water passes through a connection 17 to the pressure regulator whence it passes through a pipe 18 to fill the tank. The tank is provided with the usual standpipe 19 and an afterfill tube is provided at 20, as is conventional.

Figure 7:
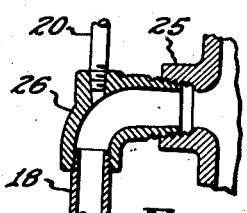
Figure 7 is a fragmentary cross sectional view through the valve outlet on a line similar to the view of Figure 5, showing the connection where a pressure regulator is not used.
Figures 4, 6:
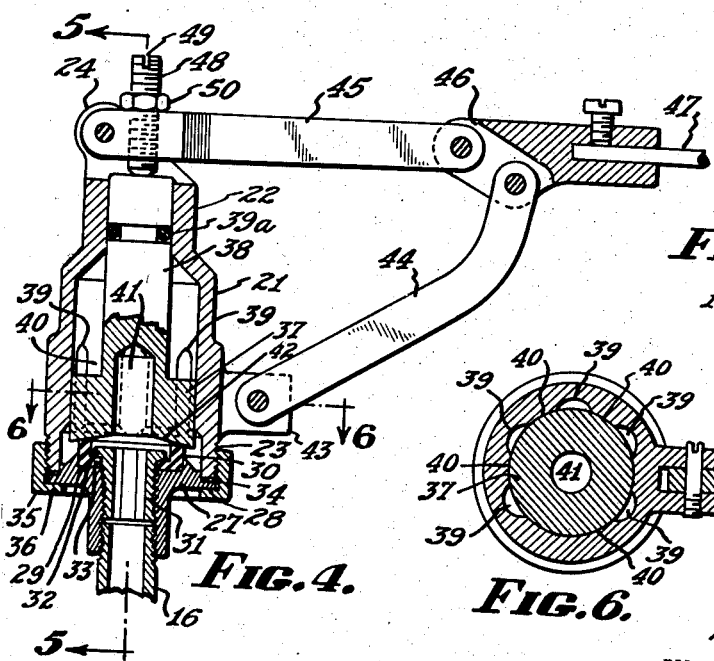
Figure 4 is an enlarged cross sectional view through the valve member itself taken on the line 4—4 of Figure 1.
Figure 6 is a horizontal cross sectional view taken on the line 6—6 of Figure 4.
Figure 5:
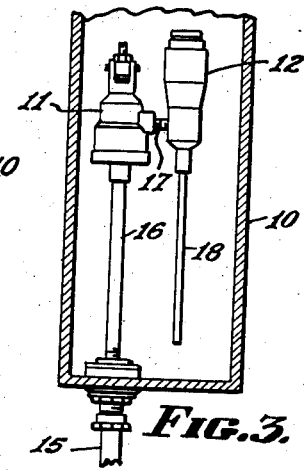
Figure 5 is a cross sectional view taken on the line 5—5 of Figure 4.

Referring now in more detail to the valve itself as shown in Figures 4 to 6, inclusive, the valve comprises a casing member indicated generally at 21, having an extension 22. The casing member is open at both ends and at its lower end is externally threaded as at 23 and is provided at its upper end with the brackets 24. The casing member 21 is provided with a fluid outlet boss 25, to which the connection 17 is made in the event that a pressure regulator as shown at 12 is to be used. If a pressure regulator is not to be used, then the connection is made as shown in Figure 7. A modified T fitting 26 is threaded into the boss 25 and to the member 26 is secured the fill tube 18 and to the reduced outlet is secured the afterfill tube 20.

The pressure regulator 12 is described in detail and claimed in a copending application filed of even date herewith.

A useful feature of the invention resides in the manner in which the valve is secured to the supply pipe 16. This is best seen in Figures 4 and 5. The end of the pipe 16 is externally threaded and there is screwed on to the end of the pipe 16 a flange member 27. The flange member 27 is provided with an annular shoulder 28 upon which the end of the valve casing may rest. The member 27 is, of course, internally threaded and is provided with an annular recess 29 in which the valve seat member is disposed. The valve seat member itself is indicated at 30 and is in the form of a flanged ring. It is preferably made of a resilient material like neoprene or other suitable material. The valve seat member 30 is secured to the flange member 27 by an externally threaded flanged plug 31 which is threaded into the member 27 with the flange 32 engaging and bearing on the flange 33 of the valve seat member.

From the foregoing, it will be clear that when the plug member 31 and valve seat member 30 are assembled to the flange member 27, and the flange member 27 is secured to the pipe 16, the valve seat member is secured to the supply pipe. The casing 21 is then set upon the shoulder 28 and if desired a gasket of suitable material as indicated at 34 may be placed between the shoulder 28 and the casing 21. The casing is then secured in position by means of an internally flanged and internally threaded ring 35. The flange portion 36 of this ring engages under the flange member 27 and the internal threads of the member 35 engage the external threads on the casing.

From the foregoing description, it will be clear that if it is desired to examine, clean, or repair the valve, it is only necessary to unscrew the ring member 35, whereupon the entire valve together with the float ball and linkage mechanism can simply be lifted out of the tank.

The valve member proper is indicated generally at 37 and has a stem member 38. The stem 38 has a sliding bearing in the extension 22 and is sealed thereagainst by means of an O ring or the like at 39. The body of the valve 37 has a sliding bearing within the casing 21 and the casing is provided with internal grooves 39 to permit passage of water. The lands 40 between the grooves 39 provide bearing surfaces for the valve. Internally, the valve member is provided with a bore 41 which is preferably of slightly larger diameter than the internal diameter of the supply pipe 16. The end of the valve member 37 is concavely chamfered as indicated at 42 so that when the valve is closed, the chamfered rim 42 bears against the annular edge of the seat member 30. The valve member itself may, therefore, be considered as a bell-like member having a concavely chamfered rim for contact with the valve seat. I have found that the degree of chamfer is of extreme importance in producing silence of the valve and long wear. The chamfer should be at an angle of ten and one-half degrees from the flat upper surface of the valve seat. While this angle may be varied slightly, I have found that it cannot with impunity be varied more than about one degree in either direction.

It is also preferable that the diameter of the valve member be about one-eighth inch larger than the diameter of the valve seat, so that the edge of the seat contacts the chamfer about $\frac{1}{16}''$ from the outer edge of the chamfer. The contact may be closer to the edge, but if it is substantially farther from the edge, the valve will become noisy.

The valve member is lifted from the seat by water pressure and it is seated by means of a mechanism now to be described.

The valve casing is provided with a boss 43 to which is pivoted a link 44. A link 45 is pivoted to the brackets 24 mentioned above. The links 44 and 45 are pivotally secured to a bracket 46 which carries a rod 47 to the end of which is secured the float ball 13. Threaded through the link 45 is a screw 48 provided with a suitable screw driver slot 49 and a lock nut 50. The end of the screw 48 can bear upon the end of the valve stem 38. As the level of the liquid in the tank rises, causing the float ball to rise, the linkage operates to pivot the link 44 a very slight amount in a clockwise direction, and the link 45 also in a clockwise direction. By virtue of the separate pivoting of the links 44 and 45 to the bracket member 46, a sort of toggle action is obtained. It will be clear that the level of liquid desired can be very quickly determined by an adjustment of the screw 48 which can then be locked by means of the lock nut 50. This renders it unnecessary to bend the rod 47 which carries the float ball.

While in Figure 6 I have shown five grooves 39, I do not intend to be limited to a specific number of grooves. It is only necessary that there be no groove 39 directly aligned with the boss 25, because this would produce noise in the valve. It will be clear that numerous modifications may be made in details of construction and that I do not intend to be limited to any such details other than those set forth in the claims which follow.

Having now fully described my invention, what I claim as new and desire to secure by Letters Patent is:

1. A valve comprising a casing having a fluid outlet, a fluid inlet in said casing, a flat, annular valve seat member surrounding said inlet, a valve member comprising a bell having a bore slightly larger than the diameter in said inlet, and having a concavely, conically chamfered rim for contacting the outer edge only of said seat member, said rim extending beyond the outer edge of said seat member, and means for actuating said valve member from the exterior of said casing.

2. A valve comprising a casing having a fluid outlet, a fluid inlet in said casing, a flat, annular valve seat member surrounding said inlet, a valve member comprising a bell having a bore larger in diameter than the said inlet, and having a concavely, conically chamfered rim for contacting the outer edge only of said seat member, said rim extending beyond the outer edge of said seat member, said valve member having a sliding bearing in said casing, said casing having an extension and said valve member having a stem having a sliding bearing in said extension, sealed thereagainst and extending therebeyond.

3. A valve comprising a casing having a fluid outlet, a fluid inlet in said casing, a flat, annular valve seat member surrounding said inlet, said casing having an extension substantially aligned with said inlet, a valve member having a sliding bearing in said casing and having a stem having a sliding bearing in said extension, means for sealing said stem against said extension, said valve member comprising a bell having a bore larger in diameter than the said inlet, and having a concavely, conically chamfered rim for contacting the outer edge only of said seat member, said rim extending beyond the outer edge of said seat member, said valve member being unseated by fluid pressure, and means for seating said valve member by pressure on said stem.

4. A valve according to claim 1 in which said chamfer is between 10° and 11°.

5. A valve according to claim 1, in which said seat member is of a resilient material.

6. A valve according to claim 2 in which said chamfer is between 10° and 11°.

7. A valve according to claim 2, in which said seat member is of a resilient material.

References Cited in the file of this patent

UNITED STATES PATENTS

| Number | Name | Date |
|---|---|---|
| 254,130 | Harrison | Feb. 28, 1892 |
| 691,569 | Pohlman | Jan. 21, 1902 |
| 829,462 | Curtin | Aug. 28, 1906 |
| 1,003,179 | Gruschow | Sept. 12, 1911 |
| 1,087,001 | Dujat | Feb. 10, 1914 |
| 1,206,786 | Leonhart | Nov. 28, 1916 |
| 1,754,138 | Agee | Apr. 8, 1930 |
| 1,953,547 | Wolff | Apr. 3, 1934 |
| 2,013,860 | McElwaine | Sept. 10, 1935 |
| 2,074,698 | Langdon | Mar. 23, 1937 |
| 2,219,105 | Klein | Oct. 22, 1940 |
| 2,270,910 | Svirsky | Jan. 27, 1942 |
| 2,299,706 | Svirsky | Oct. 20, 1942 |
| 2,346,938 | Oravec | Apr. 18, 1944 |